United States Patent [19]

Yamaya et al.

[11] Patent Number: 5,049,606
[45] Date of Patent: * Sep. 17, 1991

[54] THERMOSETTING RESIN COMPOSITION

[75] Inventors: Norimasa Yamaya; Masahiro Ohta; Akihiro Yamaguchi, all of Kanagawa, Japan

[73] Assignee: Mitsui Toatsu Chemicals, Incorporated, Tokyo, Japan

[*] Notice: The portion of the term of this patent subsequent to May 16, 2006 has been disclaimed.

[21] Appl. No.: 488,443

[22] Filed: Feb. 27, 1990

Related U.S. Application Data

[63] Continuation of Ser. No. 189,717, May 3, 1988, abandoned.

[30] Foreign Application Priority Data

May 6, 1987 [JP] Japan .............. 62-108961
Dec. 18, 1987 [JP] Japan .............. 62-318712

[51] Int. Cl.$^5$ .............. C08L 79/08; C08K 3/38; C08K 3/30; C08K 3/04
[52] U.S. Cl. .............. 525/149; 525/178; 524/404; 524/406; 524/606; 524/607
[58] Field of Search .............. 528/170, 127; 524/606, 524/607, 404, 406; 525/149, 178

[56] References Cited

U.S. PATENT DOCUMENTS

| | | | |
|---|---|---|---|
| Re. 29,316 | 7/1977 | Bargain et al. | 428/474 |
| 2,712,507 | 7/1955 | Green | 117/36 |
| 3,002,385 | 10/1961 | Wahl et al. | 73/356 |
| 3,129,105 | 4/1964 | Berry et al. | 106/55 |
| 3,658,764 | 4/1972 | Bargain et al. | |
| 3,669,930 | 6/1972 | Asahara et al. | 260/47 |
| 3,695,903 | 10/1972 | Telkes et al. | 99/192 TT |
| 3,767,449 | 10/1973 | Hayashi et al. | 117/36.2 |
| 3,774,450 | 11/1973 | Godsey | 73/358 |
| 3,826,141 | 7/1974 | Pickett et al. | 73/356 |
| 3,830,777 | 8/1974 | Burton | 260/37 N |
| 3,862,918 | 1/1975 | Laurent | 524/406 |
| 3,924,027 | 12/1975 | Saito et al. | 427/147 |
| 3,954,011 | 5/1976 | Manske | 73/356 |
| 4,046,941 | 9/1977 | Saito et al. | 428/323 |
| 4,057,029 | 11/1977 | Seiter | 116/114 V |
| 4,065,345 | 12/1977 | Progar et al. | 156/308 |
| 4,075,171 | 2/1978 | D'Alelio | 260/47 CP |
| 4,076,697 | 2/1978 | Forgo et al. | |
| 4,114,926 | 9/1978 | Habib et al. | 282/27.5 |
| 4,116,937 | 9/1978 | Jones | 528/170 |
| 4,134,847 | 1/1979 | Oda et al. | 252/62.1 P |
| 4,144,284 | 3/1979 | Semanz et al. | 528/322 |
| 4,173,684 | 11/1979 | Stolfo | 428/531 |
| 4,269,893 | 5/1981 | Kato et al. | 428/341 |
| 4,301,054 | 11/1981 | Buirley et al. | 260/29.4 UA |
| 4,339,207 | 7/1982 | Hof et al. | 374/160 |
| 4,379,897 | 4/1983 | Asano et al. | 525/506 |
| 4,388,362 | 6/1983 | Iwata et al. | 428/211 |
| 4,390,596 | 6/1983 | Laurent | 428/473.5 |
| 4,393,177 | 7/1983 | Ishii et al. | 525/422 |
| 4,398,753 | 8/1983 | Asano et al. | 282/27.5 |
| 4,400,492 | 8/1983 | Asano et al. | 525/506 |
| 4,433,104 | 2/1984 | Giles, Jr. | 525/180 |
| 4,435,560 | 3/1984 | Takahashi et al. | 528/170 |
| 4,469,452 | 9/1984 | Sharpless et al. | 374/160 |
| 4,526,838 | 7/1985 | Fujioka | 528/170 |
| 4,535,101 | 8/1985 | Lee et al. | 521/189 |
| 4,598,115 | 7/1986 | Fujioka et al. | 524/376 |
| 4,599,396 | 7/1986 | Takekoshi et al. | 528/185 |
| 4,620,941 | 11/1986 | Yoshikawa et al. | 252/408.1 |
| 4,634,588 | 1/1987 | Moroe | 424/48 |
| 4,637,896 | 1/1987 | Shannon | 252/299.7 |
| 4,691,028 | 9/1987 | Domeier et al. | 528/172 |
| 4,704,379 | 11/1987 | Shioi et al. | 503/211 |
| 4,707,316 | 11/1987 | Fujioka et al. | 264/135 |
| 4,725,642 | 2/1988 | Gannett et al. | 524/600 |
| 4,729,671 | 3/1988 | Asano et al. | 376/160 |
| 4,737,568 | 4/1988 | Stenzenberger | 528/170 |
| 4,748,259 | 5/1988 | Nachbur | 556/132 |
| 4,777,237 | 10/1988 | Dien | 528/170 |
| 4,783,521 | 11/1988 | Yamaguchi et al. | 528/206 |
| 4,831,102 | 5/1989 | Yamaya | 528/170 |

FOREIGN PATENT DOCUMENTS

| | | |
|---|---|---|
| 0192480 | 9/1986 | European Pat. Off. |
| 0233435 | 8/1987 | European Pat. Off. |
| 0253586 | 1/1988 | European Pat. Off. |
| 0268878 | 6/1988 | European Pat. Off. |
| 0283924 | 9/1988 | European Pat. Off. |
| 9309 | 5/1965 | Japan |
| 20144 | 10/1967 | Japan |
| 15111 | 5/1972 | Japan |
| 10856 | 3/1974 | Japan |
| 1327 | 1/1977 | Japan |
| 124032 | 9/1980 | Japan |
| 4319 | 1/1982 | Japan |
| 28559 | 2/1982 | Japan |
| 222822 | 12/1983 | Japan |
| 76088 | 4/1984 | Japan |
| 53984 | 3/1985 | Japan |
| 59560 | 3/1985 | Japan |
| 80162 | of 1986 | Japan |
| 96652 | of 1986 | Japan |
| 100493 | 5/1986 | Japan |
| 101932 | 5/1986 | Japan |
| 108513 | 7/1986 | Japan |
| 194055 | 8/1986 | Japan |
| 221158 | 10/1986 | Japan |
| 6218 | 1/1987 | Japan |
| 18472 | 1/1987 | Japan |
| 19672 | 1/1987 | Japan |
| 84045 | 4/1987 | Japan |
| 87030 | 4/1987 | Japan |
| 96449 | 5/1987 | Japan |
| 112537 | 5/1988 | Japan |
| 132857 | 6/1988 | Japan |
| 56724 | 3/1989 | Japan |
| 77515 | 3/1989 | Japan |
| 1263234 | 2/1972 | United Kingdom |
| 1440550 | 6/1976 | United Kingdom |

OTHER PUBLICATIONS

Katz, Handbook of Fillers and Reinforcements for Plastics, (1978), pp. 144–145.

*Primary Examiner*—John C. Bleutge
*Assistant Examiner*—David Buttner
*Attorney, Agent, or Firm*—Fisher, Christen & Sabol

[57] ABSTRACT

A thermosetting resin composition formed of a polyaminobismaleimide resin, which is composed of a bismaleimide compound and a diamine compound, and a solid lubricant. The composition has low coefficient of friction and excellent wear resistance, and can be utilized for self-lubricating parts.

1 Claim, No Drawings

THERMOSETTING RESIN COMPOSITION

This application is a continuation of prior U.S. application Ser. No. 189,717, filing date May 3, 1988, now abandoned.

BACKGROUND OF THE INVENTION a) Field of the Invention:

This invention relates to a novel thermosetting resin composition having excellent self-lubricating properties.

b) Description of the Prior Art:

Thermosetting resins having an imide structure are expected to find utility as self-lubricating parts owing to their excellent heat resistance and the dimensional stability of their molded articles and superb wear resistance. Among others, thermosetting resins composed of an aromatic bismaleimide and an aromatic diamine have relatively good moldability and processability and excellent self-lubricating properties. Articles formed or molded from a polyaminobismaleimide resin composed of, for example, N,N'-(4,4'-methylenediphenylene)bismaleimide and 4,4'-diaminodiphenylmethane have been used widely as self-lubricating parts for their superb abrasion and wear resistance.

A variety of forming or molding materials making use of this resin are however accompanied by the drawbacks that their specific abrasion loss becomes greater as their coefficient of friction becomes low and their coefficient of friction becomes higher as their specific abrasion loss becomes small on the contrary. It has been impossible to obtain forming or molding materials having well-balanced coefficient of friction and specific abrasive loss.

SUMMARY OF THE INVENTION

An object of this invention is to provide a novel thermosetting resin composition having low coefficient of friction and superb wear resistance.

The above object of this invention has now been accomplished by the provision of a thermosetting resin composition comprising:

100 parts by weight of a polyaminobismaleimide resin composed of a bismaleimide compound represented by the following general formula (I):

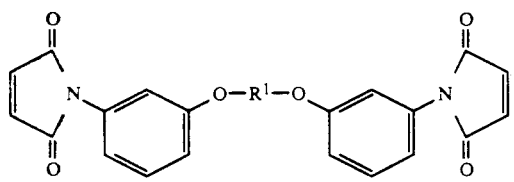

wherein $R^1$ means a divalent group of

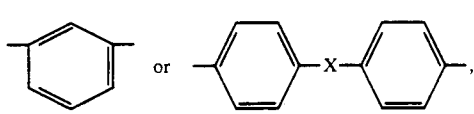

and X denotes a direct bond or a group selected from divalent hydrocarbon group having 1-10 carbon atoms, hexafluorinated isopropylidene group, carbonyl group, thio group, sulfinyl group, sulfonyl group and oxo group, and a diamine compound represented by the following general formula (II):

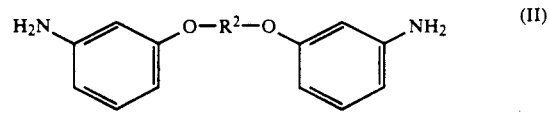

wherein $R^2$ means a divalent group of

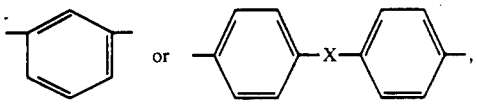

and X denotes a direct bond or a group selected from divalent hydrocarbon group having 1-10 carbon atoms, hexafluorinated isopropylidene group, carbonyl group, thio group, sulfinyl group, sulfonyl group and oxo group; and 5-200 parts by weight of a solid lubricant.

The thermosetting resin composition of this invention has a low coefficient of friction and excellent wear resistance, and can be utilized for various bearing materials such as thrust bearing and journal bearing and self-lubricating parts such as a piston ring, piston skirt, gear hopper, chute, hook, various pump parts, cam, roller, thrust washer and various parts of a valve.

DETAILED DESCRIPTION OF THE INVENTION

Illustrative examples of the bismaleimide compound (I), which is useful as one of the components of the polyaminobismaleimide resin in the present invention, include:

1,3-bis(3-maleimidophenoxy)benzene;
bis[4-(3-maleimidophenoxy)phenyl]methane;
1,1-bis[4-(3-maleimidophenoxy)phenyl]ethane;
1,2-bis[4-(3-maleimidophenoxy)phenyl]ethane;
2,2-bis[4-(3-maleimidophenoxy)phenyl]propane;
2,2-bis[4-(3-maleimidophenoxy)phenyl]butane;
2,2-bis[4-(3-maleimidophenoxy)phenyl]-1,1,1,3,3,3,-hexafluoropropane;
4,4'-bis(3-maleimidophenoxy)biphenyl;
bis[4-(3-maleimidophenoxy)phenyl]ketone;
bis[4-(3-maleimidophenoxy)phenyl]sulfide;
bis[4-(3-maleimidophenoxy)phenyl]sulfoxide;
bis[4-(3-maleimidophenoxy)phenyl]sulfone; and
bis[4-(3-maleimidophenoxy)phenyl]ether.

They may be used either singly or in combination. These bismaleimide compounds may be prepared easily by subjecting their corresponding diamine compounds and maleic anhydride to condensation and dehydration.

Illustrative specific examples of the other component, the diamine compound (II), include:

1,3-bis(3-aminophenoxy)benzene;
bis[4-(3-aminophenoxy)phenyl]methane;
1,1-bis[4-(3-aminophenoxy)phenyl]ethane;
1,2-bis[4-(3-aminophenoxy)phenyl]ethane;
2,2-bis[4-(3-aminophenoxy)phenyl]propane;
2,2-bis[4-(3-aminophenoxy)phenyl]butane;
2.2-bis[4-(3-aminophenoxy)phenyl]-1,1,1,3,3,3-hexafluoropropane;
4,4'-bis(3-aminophenoxy)biphenyl;
bis[4-(3-aminophenoxy)phenyl]ketone;

bis[4-(3-aminophenoxy)phenyl]sulfide;
bis[4-(3-aminophenoxy)phenyl]sulfoxide;
bis[4-(3-aminophenoxy)phenyl]sulfone; and
bis[4-(3-aminophenoxy)phenyl]ether.

They may also be used either singly or in combination.

As polyaminobismaleimide resins composed of the above-exemplified bismaleimide compounds and diamine compounds, may be mentioned (1) those obtained by simply mixing them and (2) those obtained by subjecting them to a heat treatment and then grinding the resultant mixture into pellets or powder. As heating conditions for the heat treatment, it is preferable to choose conditions in which they are partly hardened to the stage of prepolymer. In general, it is suitable to heat them at 70°–220° C. for 5–240 minutes, preperably at 80°–200° C. for 10–180 minutes. Also included are (3) those obtained by dissolving them in an organic solvent, pouring the resultant solution into a bad solvent, collecting the resultant crystals by filtration and then drying the thus-collected crystals into pellets or powder or by dissolving them in an organic solvent, hardening them partly to the stage of prepolymers, discharging the resultant mixture into a bad solvent, collecting the resultant crystals by filtration and then drying the thus-collected crystals into pellets or powder. As exemplary organic solvents usable upon formation of the resins (3), may be mentioned halogenated hydrocarbons such as methylene chloride, dichloroethane and trichloroethylene; ketones such as acetone, methyl ethyl ketone, cyclohexanone and diisopropyl ketone; ethers such as tetrahydrofuran, dioxane and methylcellosolve; aromatic compounds such as benzene, toluene and chlorobenzene; and aprotic polor solvents such as acetonitrile, N,N-dimethylformamide, N,N-dimethylacetoamide, dimethyl sulfoxide, N-methyl-2-pyrrolidone and 1,3-dimethyl-2-imidazolidinone.

Regarding the proportions of each bismaleimide compound and its corresponding diamine compound, the diamine compound may be used in an amount of 0.1–1.2 moles, preferably 0.2–0.8 mole, per mole of the bismaleimide compound. If the diamine compound is used in a smaller proportion, it is difficult to obtain a resin having good impact resistance and flexibility upon hardening. On the other hand, any unduly high proportions give deleterious effects to the heat resistance of a hardened resin to be obtained.

A variety of solid lubricants may be used in the present invention, including fluororesins, graphite, molybdenum disulfide, boron nitride, tungsten disulfide, lead oxide, lead powder, copper powder, bronze powder and silver powder by way of example. The use of fluororesins, graphite, molybdenum disulfide and boron nitride is particularly preferred. The particle size distribution of the solid lubricants used in the present invention may desirably range from 1 to 50 μm.

The term "fluororesins" as used herein means synthetic polymers containing fluorine atoms (F) in their molecules. In general, they have excellent heat resistance, chemical resistance and electric characteristics (particularly high-frequency resistance) compared with other synthetic resins, and low coefficient of friction and blocking resistance inherent to the fluororesins. As typical examples of the fluororesins, may be mentioned those of the following rational formulae:

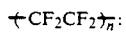
Polytetrafluoroethylene (PTFE);  (1)

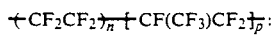
Tetrafluoroethylene-hexafluoropropylene copolymer (FEP);  (2)

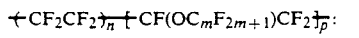
Tetrafluoroethylene-perfluoroalkyl vinyl ether copolymer (PFA);  (3)

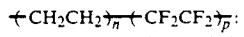
Ethylene-tetrafluoroethylene copolymer (ETFE);  (4)

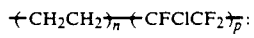
Ethylene-trifluorochloroethylene copolymer (ECTFE); and  (5)

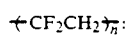
Polyvinylidene fluoride (PVDF).  (6)

These fluororesins may be used either singly or in combination. Among others, the use of polytetrafluoroethylene (PTFE), which has been fluorinated completely, is most preferred because it is superior in the above-mentioned properties and characteristics to other fluororesins. The fluororesin used in the thermosetting resin composition of this invention is generally in the form of powder and has a particle size of about 1–25 μm, preferably about 5–10 μm. A particularly preferred fluororesin is PTFE marketed under "Teflon KPL-610" (trade mark) from Mitsui Fluorochemical K. K.

In this invention, the fluororesin may be used in a proportion of 5–200 parts by weight, preferably 20–150 parts by weight, per 100 parts by weight of the polyaminobismaleimide resin. If the fluororesin is used in a proportion smaller than 5 parts by weight, the resultant composition having both low coefficient of friction and excellent wear resistance is not obtained. On the contrary, any proportions of the fluororesin greater than 200 parts by weight will result in a resin composition having reduced heat resistance. It is thus unpreferable to use the fluororesin in any amounts outside the above range.

Graphite useful in the practice of this invention is a kind of carbon having a crystal form belonging to the hexagonal system and has excellent heat resistance and chemical resistance, and moreover superb properties that it is flexible and high in lubricity. Graphite is roughly classified into natural graphite and synthetic graphite. Natural graphite is produced as underground resources similarly to other minerals and is that graphitized by geothermy and high rock pressure in the course of years. On the other hand, synthetic graphite is that obtained by subjecting pitch coke to a heat treatment at about 2,300° C., thereby graphitizing it. Both graphites are separately ground in ball mill or the like into powder having a predetermined particle size distribution. Graphite usable in the practice of this invention may be either one of these graphites or a mixture thereof. The particle size distribution of graphite may preferably range from 1 to 50 μm. There may also be used those obtained by treating the surface of graphite with one of various treatment agents such as epoxy resin, polyamide resin, polycarbonate resin and polyacetal resin, or any known surface treatment agent conforming with the application purpose.

In this invention, graphite may be used in a proportion of 5-200 parts by weight, preferably 20-150 parts by weight, per 100 parts by weight of the polyaminobismaleimide resin. If graphite is used in a proportion smaller than 5 parts by weight, the resultant composition having both low coefficient of friction, and excellent wear resistance is not obtained. On the contrary, any proportions greater than 200 parts by weight will result in a resin composition having reduced mechanical strength. It is thus unpreferable to use graphite in any amounts outside the above range.

Molybdenum disulfide useful in the practice of this invention has a crystal form belonging to the hexagonal system and has excellent heat resistance and chemical resistance, and moreover superb properties that it is flexible and high in lubricity. Molybdenum disulfide exists as a natural ore, molybdenite. Molybdenum disulfide used in the present invention is that obtained by grinding this ore in a ball mill or the like into powder having a predetermined particle size distribution. The particle size distribution may preferably range from 1 to 50 μm.

In this invention, molybdenum disulfide may be used in a proportion of 5-200 parts by weight, preferably 20-150 parts by weight, per 100 parts by weight of the polyaminobismaleimide resin. If molybdenum disulfide is used in a proportion smaller than 5 parts by weight, the resultant composition having both a low coefficient of friction and excellent wear resistance is not obtained. On the contrary, any proportions greater than 200 parts by weight will result in a resin composition having reduced mechanical strength. It is thus unpreferable to use molybdenum disulfide in any amounts outside the above range.

Boron nitride useful in the practice of this invention has a crystal form belonging to the hexagonal system and has excellent heat resistance and chemical resistance, and moreover superb properties that it is flexible and high in lubricity. Boron nitride is industrially produced by heating ammonia and boron oxide, or ammonium chloride and borax. boron nitride used in the present invention is that obtained by grinding this ore in a ball mill or the like into powder having a predetermined particle size distribution. The particle size distribution may preferably range from 1 to 50 μm.

In this invention, boron nitride may be used in a proportion of 5-200 parts by weight, preferably 20-150 parts by weight, per 100 parts by weight of the polyaminobismaleimide resin. If boron nitride is used in a proportion smaller than 5 parts by weight, the resultant composition having both low coefficient of friction and excellent wear resistance is not obtained. On the contrary, any proportions greater than 200 parts by weight will result in a resin composition having reduced mechanical strength. It is thus unpreferable to use boron nitride in any amounts outside the above range.

Although the thermosetting resin composition according to the present invention may be prepared by a method known generally in the art, the following methods are particularly preferred:

(1) After premixing the polyaminobismaleimide resin in the form of powder and solid lubricant in a mortar, Henschel mixer, drum blender, tumbler mixer, ball mill, ribbon blender or similar device, the resultant mixture is kneaded by a conventionally-known means such as a melting and mixing machine or heated roll and is then formed into pellets or powder.

(2) The polyaminobismaleimide resin powder is either dissolved or suspended in an organic solvent in advance. The solid lubricant is added to the resultant solution or suspension. After removing the solvent in a hot-air oven, the resultant mixture is formed into pellets or powder. Since the temperature and time required for the kneading vary depending on the properties of the polyaminobismaleimide resin employed, they may be adjusted suitably so that the softening temperature and gelling time of the resultant composition fall within a range of 70°-180° C. and a range 30-180 seconds at 200° C. Illustrative examples of the organic solvent include N,N-dimethylformamide, N,N-dimethylacetamide, N,N-diethylacetamide, N,N-dimethyl-methoxyacetamide, N-methyl-2-pyrrolidone, 1,3-dimethy-2-imidazolidinone, N-methylcaprolactam, 1,2-dimethoxyethane, bis(2-methoxyethyl)ether, 1,2-bis(2-methoxyethyl)ethane, bis[(2-methoxyethoxy)ethyl]ether, tetrahydrofuran, 1,3-dioxane, 1,4-dioxane, pyridine, picoline, dimethyl sulfoxide, dimethyl sulfone, tetramethylurea, hexamethylphosphorus amide, m-cresol and acetone. These organic solvents may be used either singly or in combination.

The thermosetting resin composition of this invention may be added with a polymerization catalyst as needed. No particular limitation is imposed on the proportion of the catalyst. It is however preferable to use the catalyst within a range of 0.001-10 wt. %, preferably 0.1-5 wt. %, based on the total weight of the resultant polymer. As the polymerization catalyst, a known free radical catalyst is effective such as benzoyl peroxide, t-butylhydroperoxide, dicumyl peroxide, azobisisobutyronitrile or azobiscyclohexanecarbonitrile. Two or more of these polymerization catalysts may be used suitably in combination.

Further, it is also possible to add one or more of fibrous reinforcing materials such as glass fibers, carbon fibers, aromatic polyamide fibers, potassium titanate fibers, silicon carbide fibers, alumina fibers, boron fibers and ceramic fibers to the thermosetting resin composition of the present invention, as long as the object of this invention is not impaired.

Still further, it is also possible to add one or more of conventional additives such as antioxidant, heat stabilizers, ultraviolet absorbents, flame retardants, antistatic agents, lubricants, colorants and other additives to the composition of the present invention, as long as the object of this invention is not impaired.

The thermosetting resin composition according to this invention is formed or molded for practical use by a method known per se in the art, for example, by compression molding, transfer molding, extrusion molding or injection molding.

EXAMPLES 1-4

A powder mixture, which had been obtained in advance by mixing 1057 g (2 moles) of 4,4'-bis(3-maleimidophenoxy)biphenyl and 368 g (1 mole) of 4,4'-bis(3-aminophenoxy)biphenyl, was charged in a stainless steel vessel equipped with a stirrer, a reflux condenser and a nitrogen gas inlet tube. They were heated, molten and reacted at 180° C. for 20 minutes. The reaction product was then cooled to room temperature. The reaction product, which had been solidified into a transparent glass-like mass of a brown color, was broken into pieces and taken out of the vessel. It was ground further in a mortar and then sifted through a 60-mesh sieve, thereby obtaining a fine yellow powder of a partly-hardened polyaminobismaleimide resin. Yield: 1390 g (97.5%). Its softening temperature was 118° C., while its gelling time was 59–75 seconds at 200° C.

To 100 parts-by-weight portions of the thus-obtained polyaminobismaleimide resin powder, a fluororesin ("Teflon KPL-610", trade name; product of Mitsui Fluorochemical K.K.) having a particle size distribution of 1–30 μm was added in the amounts shown in Table 1. The resultant mixtures were mixed separately by a Henschel mixer (manufactured by Kawata Seisakusho K.K.), thereby obtaining thermosetting resin compositions.

After each of the compositions was formed into tablets and the resultant tablets were preheated, they were held in a transfer molding machine (maximum clamping force: 50 t, manufactured by Hoshino Kikai K.K.) at a cylinder temperature of 120° C. and a mold temperature of 250° C. for 5 hours, thereby obtaining molded articles. Thereafter, the thus-obtained molded articles were separately subjected to post curing for 4 hours in a hot-air Gear oven maintained at 250° C., thereby obtaining specimens for measuring self-lubricating properties.

Self-lubrication properties (coefficient of dynamic friction and specific abrasion loss) were measured by using a thrust-type abrasion tester (manufactured by Toyo Seiki Seisaku-Sho, Ltd.). The coefficient of dynamic friction was measured without lubrication against stainless steel (45 C) having a sliding surface of 2 cm$^2$ (cylindrical form of outer diameter: 25.6 mm$\phi$ and inner diameter: 20.0 mm$\phi$, 3S-finished) as a metal at a sliding speed of 6 m/min under a load of 10 kg/cm$^2$, while the specific abrasion loss was determined at a sliding speed of 100 m/min under a load of 5 kg/cm$^2$. The results shown in Table 1 were obtained.

EXAMPLE 5

To 100 parts-by-weight portions of a polyaminobismaleimide resin obtained from 1057 g (2 moles) of 4,4'-bis(3-maleimidophenoxy)biphenyl and 221 g (0.6 mole) of 4,4'-bis(3-aminophenoxy)biphenyl in the same manner as in Examples 1–4, the same fluororesin ("Teflon KPL-610", trade name; product of Mitsui Fluorochemical K.K.) as those employed in Examples 1–4 was added in the amount shown in Table 1. The procedure of Examples 1–4 was thereafter followed to obtain the results shown in Table 1.

EXAMPLE 6

To 100 parts-by-weight portions of a polyaminobismaleimide resin obtained from 1057 g (2 moles) of 4,4'-bis(3-maleimidophenoxy)biphenyl and 515 g (1.4 moles) of 4,4'-bis(3-aminophenoxy)biphenyl in the same manner as in Examples 1–4, the same fluororesin ("Teflon KPL-610", trade name; product of Mitsui Fluorochemical K.K.) as those employed in Examples 1–4 was added in the amount shown in Table 1. The procedure of Examples 1–4 was thereafter followed to obtain the results shown in Table 1.

EXAMPLE 7

To 100 parts by weight of a polyaminobismaleimide resin obtained in the same manner as in Examples 1–4, was added 150 parts by weight of acetone to form a suspension. To the suspension, 50 parts by weight of the same fluororesin ("Teflon KPL-610", trade name; product of Mitsui Fluorochemical K.K.) as those employed in Examples 1–4 were added, and the fluororesin was then dispersed evenly therein. After preliminarily drying the resultant mixture for 20 hours in a hot-air oven of 60° C., it was dried at 50° C. for 5 hours under reduced pressure in a vacuum dryer so that the solvent, i.e., acetone, was removed completely to obtain powder containing the fluororesin. The powder was then subjected to transfer molding in the same manner as in Examples 1–4, thereby obtaining specimens for the measurement of physical properties. Following the procedure of Examples 1–4, the specimens were tested to obtain the results shown in Table 1.

EXAMPLES 8–22 AND COMPARATIVE EXAMPLES 1–3

To 100 parts-by-weight portions of polyaminobismaleimide resins obtained by using at a molar ratio of 2:1 bismaleimide compounds and diamine compounds shown in Table 1, the same fluororesin ("Teflon KPL-610", trade name; product of Mitsui Fluorochemical K.K.) as those employed in Examples 1–4 was added in the amounts shown in Table 1. The procedure of Examples 1–4 was thereafter followed to obtain the results shown in Table 1.

EXAMPLES 23–26

To 100 parts-by-weight portions of polyaminobismaleimide resin powder obtained in the same manner as in Examples 1–4, graphite having a particle size distribution of 1–30 μm ("Ao P", trade name; product of Nippon Kokuen Kogyo K.K.) was added in the amounts shown in Table 2. The resultant mixtures were separately mixed by the Henschel mixer (manufactured by Kawata Seisakusho K.K.), thereby obtaining thermosetting resin compositions. The procedure of Examples 1–4 was thereafter followed to obtain the results shown in Table 2.

EXAMPLE 27

To 100 parts-by-weight portions of a polyaminobismaleimide resin obtained from 1057 g (2 moles) of 4,4'-bis(3-maleimidophenoxy)biphenyl and 221 g (0.6 mole) of 4,4'-bis(3-aminophenoxy)biphenyl in the same manner as in Examples 23–26, the same graphite ("Ao P", trade name; product of Nippon Kokuen Kogyo K.K.) as those employed in Examples 23–26 was added in the amount shown in Table 2. The procedure of Examples 23–26 was thereafter followed to obtain the results shown in Table 2.

EXAMPLE 28

To 100 parts-by-weight portions of a polyaminobismaleimide resin obtained from 1057 g (2 moles) of 4,4'-bis(3-maleimidophenoxy)biphenyl and 515 g (1.4 moles) of 4,4'-bis(3-aminophenoxy)biphenyl in the same manner as in Examples 23–26, the same graphite ("Ao P", trade name; product of Nippon Kokuen Kogyo K.K.) as those employed in Examples 23–26 was added in the amount shown in Table 2. The procedure of Examples 23–26 was thereafter followed to obtain the results shown in Table 2.

EXAMPLE 29

To 100 parts by weight of a polyaminobismaleimide resin obtained in the same manner as in Examples 23–26, was added 150 parts by weight of acetone to form a suspension. To the suspension, 50 parts by weight of the same graphite ("Ao P", trade name; product of Nippon Kokuen Kogyo K.K.) as those employed in Examples 23–26 were added, and the graphite was then dispersed evenly therein. After preliminarily drying the resultant mixture for 20 hours in a hot-air oven of 60° C., it was dried at 50° C. for 5 hours under reduced pressure in a vacuum dryer so that the solvent, i.e., acetone, was removed completely to obtain powder containing the graphite. The procedure of Examples 23–26 was thereafter followed to obtain the results shown in Table 2.

EXAMPLES 30–44 AND COMPARATIVE EXAMPLES 4–6

To 100 parts-by-weight portions of polyaminobismaleimide resins obtained by using at a molar ratio of 2:1 bismaleimide compounds and diamine compounds shown in Table 2, the same graphite ("Ao P", trade name; product of Nippon Kokuen Kogyo K.K.) as those employed in Examples 23–26 was added in the amounts shown in Table 2. The procedure of Examples 23–26 was thereafter followed to obtain the results shown in Table 2.

EXAMPLES 45–48

To 100 parts-by-weight portions of polyaminobismaleimide resin powder obtained in the same manner as in Examples 1–4, molybdenum disulfide having a particle size distribution of 1–5 μm ("Molycoat Z", trade name; product of Dow Corning Company) was added in the amounts shown in Table 3. The resultant mixtures were separately mixed by the Henschel mixer (manufactured by Kawata Seisakusho K.K.), thereby obtaining thermosetting resin compositions. The procedure of Examples 1–4 was thereafter followed to obtain the results shown in Table 3.

EXAMPLE 49

To 100 parts-by-weight portions of a polyaminobismaleimide resin obtained from 1057 g (2 moles) of 4,4'-bis(3-maleimidophenoxy)biphenyl and 221 g (0.6 mole) of 4,4'-bis(3-aminophenoxy)biphenyl in the same manner as in Examples 45–48, the same molybdenum disulfide ("Molycoat Z", trade name; product of Dow Corning Company) as those employed in Examples 45–48 was added in the amount shown in Table 3. The procedure of Examples 45–48 was thereafter followed to obtain the results shown in Table 3.

EXAMPLE 50

To 100 parts-by-weight portions of a polyaminobismaleimide resin obtained from 1057 g (2 moles) of 4,4'-bis(3-maleimidophenoxy)biphenyl and 515 g (1.4 moles) of 4,4'-bis(3-aminophenoxy)biphenyl in the same manner as in Examples 45–48, the same molybdenum disulfide ("Molycoat Z", trade name; product of Dow Corning Company) as those employed in Examples 45–48 was added in the amount shown in Table 3. The procedure of Examples 45–48 was thereafter followed to obtain the results shown in Table 3.

EXAMPLE 51

To 100 parts by weight of a polyaminobismaleimide resin obtained in the same manner as in Examples 45–48, was added 150 parts by weight of acetone to form a suspension. To the suspension, 50 parts by weight of the same molybdenum disulfide ("Molycoat Z", trade name; product of Dow Corning Company) as those employed in Examples 45–48 were added, and the molybdenum disulfide was then dispersed evenly therein. After preliminarily drying the resultant mixture for 20 hours in a hot-air oven of 60° C., it was dried at 50° C. for 5 hours under reduced pressure in a vacuum dryer so that the solvent, i.e., acetone, was removed completely to obtain powder containing the molybdenum disulfide. The procedure of Examples 45–48 was thereafter followed to obtain the results shown in Table 3.

EXAMPLES 52–66 AND COMPARATIVE EXAMPLES 7–9

To 100 parts-by-weight portions of polyaminobismaleimide resins obtained by using at a molar ratio of 2:1 bismaleimide compounds and diamine compounds shown in Table 3, the same molybdenum disulfide ("Molycoat Z", trade name; product of Dow Corning Company) as those employed in Examples 45–48 was added in the amounts shown in Table 3. The procedure of Examples 45–48 was thereafter followed to obtain the results shown in Table 3.

EXAMPLES 67–70

To 100 parts-by-weight portions of polyaminobismaleimide resin powder obtained in the same manner as in Examples 1–4, boron nitride having a particle size distribution of 1–5 μm (product of Wako Pure Chemical Industries, Ltd) was added in the amounts shown in Table 4. The resultant mixtures were separately mixed by the Henschel mixer (manufactured by Kawata Seisakusho K.K.), thereby obtaining thermosetting resin compositions. The procedure of Examples 1–4 was thereafter followed to obtain the results shown in Table 4.

EXAMPLE 71

To 100 parts-by-weight portions of a polyaminobismaleimide resin obtained from 1057 g (2 moles) of 4,4'-bis(3-maleimidophenoxy)biphenyl and 221 g (0.6 mole) of 4,4'-bis(3-aminophenoxy)biphenyl in the same manner as in Examples 67–70, the same boron nitride (product of Wako Pure Chemical Industries, Ltd) as those employed in Examples 67–70 was added in the amount shown in Table 4. The procedure of Examples 67–70 was thereafter followed to obtain the results shown in Table 4.

EXAMPLE 72

To 100 parts-by-weight portions of a polyaminobismaleimide resin obtained from 1057 g (2 moles) of 4,4'-bis(3-maleimidophenoxy)biphenyl and 515 g (1.4 moles) of 4,4'-bis(3-aminophenoxy)biphenyl in the same manner as in Examples 67–70, the same boron nitride (product of Wako Pure Chemical Industries, Ltd) as those employed in Examples 67–70 was added in the amount shown in Table 4. The procedure of Examples 67–70 was thereafter followed to obtain the results shown in Table 4.

EXAMPLE 73

To 100 parts by weight of a polyaminobismaleimide resin obtained in the same manner as in Examples 67–70, was added 150 parts by weight of acetone to form a suspension. To the suspension, 50 parts by weight of the same boron nitride (product of Wako Pure Chemical Industries, Ltd) as those employed in Examples 67–70 were added, and the boron nitride was then dispersed evenly therein. After preliminarily drying the resultant mixture for 20 hours in a hot-air oven of 60° C., it was dried at 50° C. for 5 hours under reduced pressure in a vacuum dryer so that the solvent, i.e., acetone, was removed completely to obtain powder containing the boron nitride. The procedure of Examples 67-70 was thereafter followed to obtain the results shown in Table 4.

EXAMPLES 74-89 AND COMPARATIVE EXAMPLES 10-12

To 100 parts-by-weight portions of polyaminobismaleimide resins obtained by using at a molar ratio of 2:1 bismaleimide compounds and diamine compounds shown in Table 4, the same boron nitride (product of Wako Pure Chemical Industries, Ltd) as those employed in Examples 67-70 was added in the amounts shown in Table 4. The procedure of Examples 67-70 was thereafter followed to obtain the results shown in Table 4.

TABLE 1

| | Resin composition (parts by weight) Prepolymer (100 parts by weight) | | | | Specific abrasion loss × $10^{-8} \frac{cm^3 \cdot min}{kg \cdot m \cdot Hr}$ |
|---|---|---|---|---|---|
| | Bismaleimide | Diamine | Fluororesin | Coefficient of abrasion | |
| Ex. 1 | 4,4'-Bis(3-maleimido-phenoxy)biphenyl | 4,4'-Bis(3-amino-phenoxy)biphenyl | 10 | 0.25 | 170 |
| Ex. 2 | 4,4'-Bis(3-maleimido-phenoxy)biphenyl | 4,4'-Bis(3-amino-phenoxy)biphenyl | 50 | 0.17 | 97 |
| Ex. 3 | 4,4'-Bis(3-maleimido-phenoxy)biphenyl | 4,4'-Bis(3-amino-phenoxy)biphenyl | 80 | 0.15 | 123 |
| Ex. 4 | 4,4'-Bis(3-maleimido-phenoxy)biphenyl | 4,4'-Bis(3-amino-phenoxy)biphenyl | 150 | 0.14 | 221 |
| Ex. 5 | 4,4'-Bis(3-maleimido-phenoxy)biphenyl | 4,4'-Bis(3-amino-phenoxy)biphenyl | 50 | 0.18 | 96 |
| Ex. 6 | 4,4'-Bis(3-maleimido-phenoxy)biphenyl | 4,4'-Bis(3-amino-phenoxy)biphenyl | 50 | 0.18 | 102 |
| Ex. 7 | 4,4'-Bis(3-maleimido-phenoxy)biphenyl | 4,4'-Bis(3-amino-phenoxy)biphenyl | 50 | 0.17 | 97 |
| Ex. 8 | 4,4'-Bis(3-maleimido-phenoxy)biphenyl | 1,3-Bis(3-amino-phenoxy)benzene | 50 | 0.17 | 100 |
| Ex. 9 | 4,4'-Bis(3-maleimido-phenoxy)biphenyl | 2,2-Bis[4-(3-amino-phenoxy)phenyl]propane | 50 | 0.18 | 95 |
| Ex. 10 | 4,4'-Bis(3-maleimido-phenoxy)biphenyl | Bis[4-(3-aminophenoxy)-phenyl]sulfide | 50 | 0.18 | 96 |
| Ex. 11 | 1,3-Bis(3-maleimido-phenoxy)benzene | 4,4'-Bis(3-amino-phenoxy)biphenyl | 50 | 0.17 | 96 |
| Ex. 12 | 1,3-Bis(3-maleimido-phenoxy)benzene | 1,3-Bis(3-amino-phenoxy)benzene | 50 | 0.17 | 101 |
| Ex. 13 | 1,3-Bis(3-maleimido-phenoxy)benzene | 2,2-Bis[4-(3-amino-phenoxy)phenyl]propane | 50 | 0.17 | 99 |
| Ex. 14 | 1,3-Bis(3-maleimido-phenoxy)benzene | Bis[4-(3-aminophenoxy)-phenyl]sulfide | 50 | 0.17 | 103 |
| Ex. 15 | 2,2-Bis[4-(3-maleimidophenoxy)phenyl)-propane | 4,4'-Bis(3-amino-phenoxy)biphenyl | 50 | 0.18 | 97 |
| Ex. 16 | 2,2-Bis[4-(3-maleimidophenoxy)phenyl)-propane | 1,3-Bis(3-amino-phenoxy)benzene | 50 | 0.18 | 97 |
| Ex. 17 | 2,2-Bis[4-(3-maleimidophenoxy)phenyl)-propane | 2,2-Bis[4-(3-amino-phenoxy)phenyl]propane | 50 | 0.18 | 95 |
| Ex. 18 | 2,2-Bis[4-(3-maleimidophenoxy)phenyl)-propane | Bis[4-(3-aminophenoxy)-phenyl]sulfide | 50 | 0.18 | 97 |
| Ex. 19 | Bis[4-(3-maleimidophenoxy)phenyl]-sulfide | 4,4'-Bis(3-amino-phenoxy)biphenyl | 50 | 0.17 | 98 |
| Ex. 20 | Bis[4-(3-maleimidophenoxy)phenyl]-sulfide | 1,3-Bis(3-amino-phenoxy)benzene | 50 | 0.17 | 95 |
| Ex. 21 | Bis[4-(3-maleimidophenoxy)phenyl]-sulfide | 2,2-Bis[4-(3-amino-phenoxy)phenyl]propane | 50 | 0.17 | 103 |
| Ex. 22 | Bis[4-(3-maleimidophenoxy)phenyl]-sulfide | Bis[4-(3-aminophenoxy)-phenyl]sulfide | 50 | 0.18 | 99 |
| Comp. Ex. 1 | 4,4'-Bis(3-maleimido-phenoxy)biphenyl | 4,4'-Bis(3-amino-phenoxy)biphenyl | 0 | 0.45 | 460 |
| Comp. Ex. 2 | 4,4'-Bis(3-maleimido-phenoxy)biphenyl | 4,4'-Bis(3-amino-phenoxy)biphenyl | 2 | 0.42 | 470 |
| Comp. Ex. 3 | 4,4'-Bis(3-maleimido-phenoxy)biphenyl | 4,4'-Bis(3-amino-phenoxy)biphenyl | 250 | 0.12 | 3900 |

TABLE 2

| | Resin composition (parts by weight) Prepolymer (100 parts by weight) | | | | Specific abrasion loss × $10^{-8} \frac{cm^3 \cdot min}{kg \cdot m \cdot Hr}$ |
|---|---|---|---|---|---|
| | Bismaleimide | Diamine | Graphite | Coefficient of abrasion | |
| Ex. 23 | 4,4'-Bis(3-maleimido-phenoxy)biphenyl | 4,4'-Bis(3-amino-phenoxy)biphenyl | 10 | 0.26 | 215 |
| Ex. 24 | 4,4'-Bis(3-maleimido-phenoxy)biphenyl | 4,4'-Bis(3-amino-phenoxy)biphenyl | 50 | 0.17 | 85 |

TABLE 2-continued

| | Resin composition (parts by weight) Prepolymer (100 parts by weight) | | Graphite | Coefficient of abrasion | Specific abrasion loss × $10^{-8} \frac{cm^3 \cdot min}{kg \cdot m \cdot Hr}$ |
|---|---|---|---|---|---|
| | Bismaleimide | Diamine | | | |
| Ex. 25 | 4,4'-Bis(3-maleimido-phenoxy)biphenyl | 4,4'-Bis(3-amino-phenoxy)biphenyl | 80 | 0.15 | 100 |
| Ex. 26 | 4,4'-Bis(3-maleimido-phenoxy)biphenyl | 4,4'-Bis(3-amino-phenoxy)biphenyl | 150 | 0.14 | 205 |
| Ex. 27 | 4,4'-Bis(3-maleimido-phenoxy)biphenyl | 4,4'-Bis(3-amino-phenoxy)biphenyl | 50 | 0.19 | 95 |
| Ex. 28 | 4,4'-Bis(3-maleimido-phenoxy)biphenyl | 4,4'-Bis(3-amino-phenoxy)biphenyl | 50 | 0.18 | 97 |
| Ex. 29 | 4,4'-Bis(3-maleimido-phenoxy)biphenyl | 4,4'-Bis(3-amino-phenoxy)biphenyl | 50 | 0.20 | 89 |
| Ex. 30 | 4,4'-Bis(3-maleimido-phenoxy)biphenyl | 1,3-Bis(3-amino-phenoxy)benzene | 50 | 0.19 | 92 |
| Ex. 31 | 4,4'-Bis(3-maleimido-phenoxy)biphenyl | 2,2-Bis[4-(3-amino-phenoxy)phenyl]propane | 50 | 0.18 | 103 |
| Ex. 32 | 4,4'-Bis(3-maleimido-phenoxy)biphenyl | Bis[4-(3-aminophenoxy)-phenyl]sulfide | 50 | 0.18 | 100 |
| Ex. 33 | 1,3-Bis(3-maleimido-phenoxy)benzene | 4,4'-Bis(3-amino-phenoxy)biphenyl | 50 | 0.17 | 97 |
| Ex. 34 | 1,3-Bis(3-maleimido-phenoxy)benzene | 1,3-Bis(3-amino-phenoxy)benzene | 50 | 0.18 | 125 |
| Ex. 35 | 1,3-Bis(3-maleimido-phenoxy)benzene | 2,2-Bis[4-(3-amino-phenoxy)phenyl]propane | 50 | 0.18 | 100 |
| Ex. 36 | 1,3-Bis(3-maleimido-phenoxy)benzene | Bis[4-(3-aminophenoxy)-phenyl]sulfide | 50 | 0.18 | 98 |
| Ex. 37 | 2,2-Bis[4-(3-male-imidophenoxy)phenyl)-propane | 4,4'-Bis(3-amino-phenoxy)biphenyl | 50 | 0.17 | 95 |
| Ex. 38 | 2,2-Bis[4-(3-male-imidophenoxy)phenyl)-propane | 1,3-Bis(3-amino-phenoxy)benzene | 50 | 0.17 | 100 |
| Ex. 39 | 2,2-Bis[4-(3-male-imidophenoxy)phenyl)-propane | 2,2-Bis[4-(3-amino-phenoxy)phenyl]propane | 50 | 0.18 | 112 |
| Ex. 40 | 2,2-Bis[4-(3-male-imidophenoxy)phenyl)-propane | Bis[4-(3-aminophenoxy)-phenyl]sulfide | 50 | 0.18 | 105 |
| Ex. 41 | Bis[4-(3-maleimido-phenoxy)phenyl]-sulfide | 4,4'-Bis(3-amino-phenoxy)biphenyl | 50 | 0.19 | 95 |
| Ex. 42 | Bis[4-(3-maleimido-phenoxy)phenyl]-sulfide | 1,3-Bis(3-amino-phenoxy)benzene | 50 | 0.18 | 123 |
| Ex. 43 | Bis[4-(3-maleimido-phenoxy)phenyl]-sulfide | 2,2-Bis[4-(3-amino-phenoxy)phenyl]propane | 50 | 0.18 | 120 |
| Ex. 44 | Bis[4-(3-maleimido-phenoxy)phenyl]-sulfide | Bis[4-(3-aminophenoxy)-phenyl]sulfide | 50 | 0.18 | 122 |
| Comp. Ex. 4 | 4,4'-Bis(3-maleimido-phenoxy)biphenyl | 4,4'-Bis(3-amino-phenoxy)biphenyl | 0 | 0.45 | 460 |
| Comp. Ex. 5 | 4,4'-Bis(3-maleimido-phenoxy)biphenyl | 4,4'-Bis(3-amino-phenoxy)biphenyl | 2 | 0.41 | 450 |
| Comp. Ex. 6 | 4,4'-Bis(3-maleimido-phenoxy)biphenyl | 4,4'-Bis(3-amino-phenoxy)biphenyl | 250 | 0.11 | 2250 |

TABLE 3

| | Resin composition (parts by weight) Prepolymer (100 parts by weight) | | Molybdenum disulfide | Coefficient of abrasion | Specific abrasion loss × $10^{-8} \frac{cm^3 \cdot min}{kg \cdot m \cdot Hr}$ |
|---|---|---|---|---|---|
| | Bismaleimide | Diamine | | | |
| Ex. 45 | 4,4'-Bis(3-maleimido-phenoxy)biphenyl | 4,4'-Bis(3-amino-phenoxy)biphenyl | 10 | 0.26 | 220 |
| Ex. 46 | 4,4'-Bis(3-maleimido-phenoxy)biphenyl | 4,4'-Bis(3-amino-phenoxy)biphenyl | 50 | 0.18 | 96 |
| Ex. 47 | 4,4'-Bis(3-maleimido-phenoxy)biphenyl | 4,4'-Bis(3-amino-phenoxy)biphenyl | 80 | 0.15 | 105 |
| Ex. 48 | 4,4'-Bis(3-maleimido-phenoxy)biphenyl | 4,4'-Bis(3-amino-phenoxy)biphenyl | 150 | 0.13 | 110 |
| Ex. 49 | 4,4'-Bis(3-maleimido-phenoxy)biphenyl | 4,4'-Bis(3-amino-phenoxy)biphenyl | 50 | 0.19 | 98 |
| Ex. 50 | 4,4'-Bis(3-maleimido-phenoxy)biphenyl | 4,4'-Bis(3-amino-phenoxy)biphenyl | 50 | 0.19 | 99 |
| Ex. 51 | 4,4'-Bis(3-maleimido-phenoxy)biphenyl | 4,4'-Bis(3-amino-phenoxy)biphenyl | 50 | 0.19 | 102 |
| Ex. 52 | 4,4'-Bis(3-maleimido-phenoxy)biphenyl | 1,3-Bis(3-amino-phenoxy)benzene | 50 | 0.18 | 100 |
| Ex. 53 | 4,4'-Bis(3-maleimido- | 2,2-Bis[4-(3-amino- | 50 | 0.19 | 104 |

TABLE 3-continued

| | Resin composition (parts by weight) Prepolymer (100 parts by weight) | | Molybdenum disulfide | Coefficient of abrasion | Specific abrasion loss × $10^{-8} \frac{cm^3 \cdot min}{kg \cdot m \cdot Hr}$ |
|---|---|---|---|---|---|
| | Bismaleimide | Diamine | | | |
| Ex. 54 | 4,4'-Bis(3-maleimido-phenoxy)biphenyl | Bis[4-(3-aminophenoxy)-phenyl]sulfide | 50 | 0.18 | 102 |
| Ex. 55 | 1,3-Bis(3-maleimido-phenoxy)benzene | 4,4'-Bis(3-amino-phenoxy)biphenyl | 50 | 0.18 | 100 |
| Ex. 56 | 1,3-Bis(3-maleimido-phenoxy)benzene | 1,3-Bis(3-amino-phenoxy)benzene | 50 | 0.19 | 110 |
| Ex. 57 | 1,3-Bis(3-maleimido-phenoxy)benzene | 2,2-Bis[4-(3-amino-phenoxy)phenyl]propane | 50 | 0.20 | 102 |
| Ex. 58 | 1,3-Bis(3-maleimido-phenoxy)benzene | Bis[4-(3-aminophenoxy)-phenyl]sulfide | 50 | 0.18 | 98 |
| Ex. 59 | 2,2-Bis[4-(3-maleimidophenoxy)phenyl)-propane | 4,4'-Bis(3-amino-phenoxy)biphenyl | 50 | 0.18 | 96 |
| Ex. 60 | 2,2-Bis[4-(3-maleimidophenoxy)phenyl)-propane | 1,3-Bis(3-amino-phenoxy)benzene | 50 | 0.18 | 96 |
| Ex. 61 | 2,2-Bis[4-(3-maleimidophenoxy)phenyl)-propane | 2,2-Bis[4-(3-amino-phenoxy)phenyl]propane | 50 | 0.19 | 98 |
| Ex. 62 | 2,2-Bis[4-(3-maleimidophenoxy)phenyl)-propane | Bis[4-(3-aminophenoxy)-phenyl]sulfide | 50 | 0.18 | 100 |
| Ex. 63 | Bis[4-(3-maleimidophenoxy)phenyl]-sulfide | 4,4'-Bis(3-amino-phenoxy)biphenyl | 50 | 0.18 | 100 |
| Ex. 64 | Bis[4-(3-maleimidophenoxy)phenyl]-sulfide | 1,3-Bis(3-amino-phenoxy)benzene | 50 | 0.18 | 100 |
| Ex. 65 | Bis[4-(3-maleimidophenoxy)phenyl]-sulfide | 2,2-Bis[4-(3-amino-phenoxy)phenyl]propane | 50 | 0.19 | 98 |
| Ex. 66 | Bis[4-(3-maleimidophenoxy)phenyl]-sulfide | Bis[4-(3-aminophenoxy)-phenyl]sulfide | 50 | 0.19 | 99 |
| Comp. Ex. 7 | 4,4'-Bis(3-maleimido-phenoxy)biphenyl | 4,4'-Bis(3-amino-phenoxy)biphenyl | 0 | 0.45 | 460 |
| Comp. Ex. 8 | 4,4'-Bis(3-maleimido-phenoxy)biphenyl | 4,4'-Bis(3-amino-phenoxy)biphenyl | 2 | 0.44 | 430 |
| Comp. Ex. 9 | 4,4'-Bis(3-maleimido-phenoxy)biphenyl | 4,4'-Bis(3-amino-phenoxy)biphenyl | 250 | 0.11 | 2700 |

TABLE 4

| | Resin composition (parts by weight) Prepolymer (100 parts by weight) | | Boron nitride | Coefficient of abrasion | Specific abrasion loss × $10^{-8} \frac{cm^3 \cdot min}{kg \cdot m \cdot Hr}$ |
|---|---|---|---|---|---|
| | Bismaleimide | Diamine | | | |
| Ex. 67 | 4,4'-Bis(3-maleimido-phenoxy)biphenyl | 4,4'-Bis(3-amino-phenoxy)biphenyl | 10 | 0.27 | 214 |
| Ex. 68 | 4,4'-Bis(3-maleimido-phenoxy)biphenyl | 4,4'-Bis(3-amino-phenoxy)biphenyl | 50 | 0.19 | 102 |
| Ex. 69 | 4,4'-Bis(3-maleimido-phenoxy)biphenyl | 4,4'-Bis(3-amino-phenoxy)biphenyl | 80 | 0.17 | 120 |
| Ex. 70 | 4,4'-Bis(3-maleimido-phenoxy)biphenyl | 4,4'-Bis(3-amino-phenoxy)biphenyl | 150 | 0.15 | 210 |
| Ex. 71 | 4,4'-Bis(3-maleimido-phenoxy)biphenyl | 4,4'-Bis(3-amino-phenoxy)biphenyl | 50 | 0.19 | 100 |
| Ex. 72 | 4,4'-Bis(3-maleimido-phenoxy)biphenyl | 4,4'-Bis(3-amino-phenoxy)biphenyl | 50 | 0.19 | 112 |
| Ex. 73 | 4,4'-Bis(3-maleimido-phenoxy)biphenyl | 4,4'-Bis(3-amino-phenoxy)biphenyl | 50 | 0.20 | 110 |
| Ex. 74 | 4,4'-Bis(3-maleimido-phenoxy)biphenyl | 1,3-Bis(3-amino-phenoxy)benzene | 50 | 0.19 | 98 |
| Ex. 75 | 4,4'-Bis(3-maleimido-phenoxy)biphenyl | 2,2-Bis[4-(3-amino-phenoxy)phenyl]propane | 50 | 0.19 | 99 |
| Ex. 76 | 4,4'-Bis(3-maleimido-phenoxy)biphenyl | Bis[4-(3-aminophenoxy)-phenyl]sulfide | 50 | 0.20 | 100 |
| Ex. 78 | 1,3-Bis(3-maleimido-phenoxy)benzene | 4,4'-Bis(3-amino-phenoxy)biphenyl | 50 | 0.20 | 98 |
| Ex. 79 | 1,3-Bis(3-maleimido-phenoxy)benzene | 1,3-Bis(3-amino-phenoxy)benzene | 50 | 0.20 | 98 |
| Ex. 80 | 1,3-Bis(3-maleimido-phenoxy)benzene | 2,2-Bis[4-(3-amino-phenoxy)phenyl]propane | 50 | 0.20 | 98 |
| Ex. 81 | 1,3-Bis(3-maleimido-phenoxy)benzene | Bis[4-(3-aminophenoxy)-phenyl]sulfide | 50 | 0.19 | 102 |
| Ex. 82 | 2,2-Bis[4-(3-maleimidophenoxy)phenyl)- | 4,4'-Bis(3-amino-phenoxy)biphenyl | 50 | 0.19 | 100 |

TABLE 4-continued

| | Resin composition (parts by weight) Prepolymer (100 parts by weight) | | Boron nitride | Coefficient of abrasion | Specific abrasion loss × $10^{-8} \frac{cm^3 \cdot min}{kg \cdot m \cdot Hr}$ |
|---|---|---|---|---|---|
| | Bismaleimide | Diamine | | | |
| Ex. 83 | 2,2-Bis[4-(3-maleimidophenoxy)phenyl]propane | 1,3-Bis(3-aminophenoxy)benzene | 50 | 0.20 | 98 |
| Ex. 84 | 2,2-Bis[4-(3-maleimidophenoxy)phenyl]propane | 2,2-Bis[4-(3-aminophenoxy)phenyl]propane | 50 | 0.19 | 98 |
| Ex. 85 | 2,2-Bis[4-(3-maleimidophenoxy)phenyl]propane | Bis[4-(3-aminophenoxy)phenyl]sulfide | 50 | 0.19 | 100 |
| Ex. 86 | Bis[4-(3-maleimidophenoxy)phenyl]sulfide | 4,4'-Bis(3-aminophenoxy)biphenyl | 50 | 0.20 | 100 |
| Ex. 87 | Bis[4-(3-maleimidophenoxy)phenyl]sulfide | 1,3-Bis(3-aminophenoxy)benzene | 50 | 0.20 | 100 |
| Ex. 88 | Bis[4-(3-maleimidophenoxy)phenyl]sulfide | 2,2-Bis[4-(3-aminophenoxy)phenyl]propane | 50 | 0.20 | 98 |
| Ex. 89 | Bis[4-(3-maleimidophenoxy)phenyl]sulfide | Bis[4-(3-aminophenoxy)phenyl]sulfide | 50 | 0.20 | 98 |
| Comp. Ex. 10 | 4,4'-Bis(3-maleimidophenoxy)biphenyl | 4,4'-Bis(3-aminophenoxy)biphenyl | 0 | 0.45 | 460 |
| Comp. Ex. 11 | 4,4'-Bis(3-maleimidophenoxy)biphenyl | 4,4'-Bis(3-aminophenoxy)biphenyl | 2 | 0.45 | 455 |
| Comp. Ex. 12 | 4,4'-Bis(3-maleimidophenoxy)biphenyl | 4,4'-Bis(3-aminophenoxy)biphenyl | 250 | 0.12 | 3000 |

What is claimed is:

1. A thermosetting resin composition comprising:

(a) 100 parts by weight of a polyaminobismaleimide resin consisting essentially of a bismaleimide compound represented by the following formula (I):

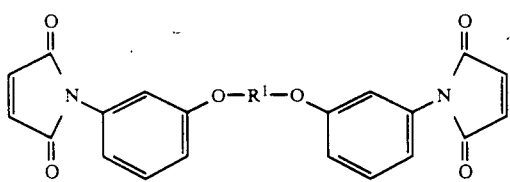

wherein $R^1$ is a divalent group of

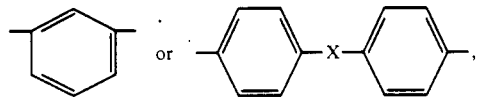

and X is a direct bond or a group selected from the group consisting of a divalent hydrocarbon group having 1 to 10 carbon atoms, a hexafluorinated isopropylidene group, a carbonyl group, a thio group, a sulfinyl group, a sulfonyl group and an oxo group, and a diamine compound represented by the following formula (II):

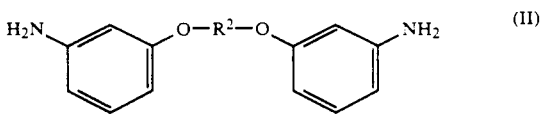

wherein $R^2$ is a divalent group of

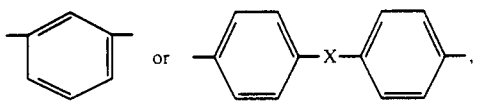

and X is a direct bond or a group selected from the group consisting of a divalent hydrocarbon group having 1 to 10 carbon atoms, a hexafluorinated isopropylidene group, a carbonyl group, a thio group, a sulfinyl group, a sulfonyl group and an oxo group; and (b) 5 to 200 parts by weight of fluororesin, the particle size distribution of which ranges from 1 to 25 μm.

* * * * *